United States Patent
Lewicki et al.

(10) Patent No.: US 9,862,140 B2
(45) Date of Patent: *Jan. 9, 2018

(54) ADDITIVE MANUFACTURING OF SHORT AND MIXED FIBRE-REINFORCED POLYMER

(71) Applicant: LAWRENCE LIVERMORE NATIONAL SECURTY, LLC, Livermore, CA (US)

(72) Inventors: James Lewicki, Oakland, CA (US); Eric B. Duoss, Dublin, CA (US); Jennifer Nicole Rodriguez, Fremont, CA (US); Marcus A. Worsley, Hayward, CA (US); Michael J. King, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 14/802,105

(22) Filed: Jul. 17, 2015

(65) Prior Publication Data

US 2017/0015061 A1    Jan. 19, 2017

(51) Int. Cl.
*B29C 67/00* (2017.01)
*B29C 64/209* (2017.01)
(Continued)

(52) U.S. Cl.
CPC .......... *B29C 64/209* (2017.08); *B29C 64/106* (2017.08); *B29C 64/118* (2017.08);
(Continued)

(58) Field of Classification Search
None
See application file for complete search history.

(56) References Cited

U.S. PATENT DOCUMENTS

| 6,299,810 B1 | 10/2001 | Blackinton, Jr. |
| 2002/0113331 A1* | 8/2002 | Zhang ............ B29C 41/003 264/40.1 |

(Continued)

FOREIGN PATENT DOCUMENTS

WO    2014071135    5/2014

OTHER PUBLICATIONS

Compton et al., "3D-Printing of Lightweight Cellular Composites," Adv. Mater. 26, pp. 5930-5935, (2014).

*Primary Examiner* — Jacob T Minskey
*Assistant Examiner* — Manley L Cummins, IV
(74) *Attorney, Agent, or Firm* — Eddie E. Scott (57) ABSTRACT

Additive manufacturing of a fiber-reinforced polymer (FRP) product using an additive manufacturing print head; a reservoir in the additive manufacturing print head; short carbon fibers in the reservoir, wherein the short carbon fibers are randomly aligned in the reservoir; an acrylate, methacrylate, epoxy, cyanate ester or isocyanate resin in the reservoir, wherein the short carbon fibers are dispersed in the acrylate, methacrylate, epoxy, cyanate ester or isocyanate resin; a tapered nozzle in the additive manufacturing print head operatively connected to the reservoir, the tapered nozzle produces an extruded material that forms the fiber-reinforced polymer product; baffles in the tapered nozzle that receive the acrylate, methacrylate, epoxy, cyanate ester or isocyanate resin with the short carbon fibers dispersed in the acrylate, methacrylate, epoxy, cyanate ester or isocyanate resin; and a system for driving the acrylate, methacrylate, epoxy, cyanate ester or isocyanate resin with the short carbon fibers dispersed in the acrylate, methacrylate, epoxy, cyanate ester or isocyanate resin from the reservoir through the tapered nozzle wherein the randomly aligned short carbon fibers in the acrylate, methacrylate, epoxy, cyanate ester or isocyanate resin are aligned by the baffles and (Continued)

wherein the extruded material has the short carbon fibers aligned in the acrylate, methacrylate, epoxy, cyanate ester or isocyanate resin that forms the fiber-reinforced polymer product.

10 Claims, 9 Drawing Sheets

(51) Int. Cl.
  *B33Y 10/00*  (2015.01)
  *B33Y 30/00*  (2015.01)
  *B33Y 70/00*  (2015.01)
  *B29C 64/106*  (2017.01)
  *B29C 64/118*  (2017.01)
  *B29C 64/20*  (2017.01)
  *B29K 105/12*  (2006.01)
  *B29K 307/04*  (2006.01)
  *B29C 64/165*  (2017.01)

(52) U.S. Cl.
  CPC .............. *B29C 64/20* (2017.08); *B33Y 10/00* (2014.12); *B33Y 30/00* (2014.12); *B33Y 70/00* (2014.12); *B29C 64/165* (2017.08); *B29K 2105/122* (2013.01); *B29K 2307/04* (2013.01)

(56) References Cited

U.S. PATENT DOCUMENTS

| | | | |
|---|---|---|---|
| 2013/0328228 A1* | 12/2013 | Pettis | F16M 13/022 |
| | | | 264/40.1 |
| 2014/0061974 A1* | 3/2014 | Tyler | B29C 67/0055 |
| | | | 264/401 |
| 2014/0361460 A1 | 12/2014 | Mark | |
| 2016/0303779 A1* | 10/2016 | Kunc | B29C 45/0001 |

\* cited by examiner

FIG. 2B (CARBON FIBER EPOXY WITH
RANDOMLY ORIENTED FIBERS)

FIG. 3A

(CARBON FIBER EPOXY
WITH ALIGNED FIBERS)

ADDITIVE MANUFACTURING OF SHORT AND MIXED FIBRE-REINFORCED POLYMER

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to additive manufacturing fibre-reinforced polymer (FRP).

State of Technology

This section provides background information related to the present disclosure which is not necessarily prior art.

U.S. Pat. No. 6,299,810 for a method for manufacturing a carbon fiber composite provides the state of technology information reproduced below.

In a first embodiment of the invention, a series of carbon fibers are fed from a creel to a lathe of a winding assembly. The size or tow of the carbon fibers typically is in the range of 1,000 to 50,000 (i.e. 1,000 to 50,000 individual strands per bundle or tow) and generally between 5 to 20 spools are used to feed fibers of varying sizes to the winding assembly. The winding assembly includes a lathe having an elongated collection trough or basin, and a carriage that is reciprocably movable along the length of the trough. The carbon fibers are fed to the carriage, which includes a wetting jig under which the fibers are passed for applying a resin material to the fibers. The resin material flows through drip openings in the wetting jig and onto the fibers, substantially coating or soaking the fibers with the resin material. The carriage is mounted along a track that extends along the length of the lathe to enable the carriage to be reciprocably movable longitudinally along the length of the lathe. A carriage motor such as a servo motor or similar variable speed reversible motor is mounted at one end of the track to control the movement of the carriage therealong and is linked to a computer control which can be programmed to vary the speed and movement of the carriage along the track, as well as to cause the cariage to pause randomly during its travel along the length of the lathe.

The lathe further includes a main rotary drive motor mounted at the head-stock end of the lathe. The main drive motor typically is a variable speed reversible electric motor, such as a servo motor, and is inked to the same computer control for the carriage motor, which controls the motor so as to operate the drive motor at varying speeds. A mandrel is received within the collection trough, connected to the drive shaft of the drive motor and is rotated by the main rotary drive motor. The mandrel generally is approximately 12 to 20 feet in length and approximately 14 to 65 inches in width, although mandrels of other, varying sizes also can be used as desired. The mandrel generally includes an outer skin or side wall and first and second ends, mounted to the drive shaft and an idler shaft of the lathe, respectively. Heating elements such as heating tapes are generally mounted within the mandrel for internally heating the skin of the mandrel during curing of the resin material. A release agent such as a plastic film, including a nylon or polyethylene film or a non-stick coating such as a water or oil-based spray solvent-based silanes, and organic waxes, or similar agent is applied to the skin of the mandrel, covering the skin and the first and second ends of the mandrel to prevent the resin material from adhering to the mandrel as the carbon fibers are wound thereabout.

As the mandrel is rotated by the lathe, the carbon fibers, with the resin material applied thereto, are wound about the mandrel as the carriage is moved longitudinally along the track in a reciprocal movement to form a weave or sample about the mandrel. Generally, in most conventional processes for forming carbon fiber composites, the speed of the carriage and rotation of the mandrel is rigidly controlled to form the weave or sample with a very precise, exact pattern. In the present invention, however, as the carbon fiber weave or sample is formed, the speed and movement of the carniage is intentionally randomly varied, including pausing or varying the movement of the carriage along the lathe assembly. In addition, other elements of "chaos" such as varying the number of and size of the fibers, varying the amount of resin material applied to the fibers, adding hard and soft pieces or loose fibers onto the mandrel, modifying the outer skin of the mandrel to change to topography of the weave, varying the speed, pitch and tension of the winding of the fibers about the mandrel, and other actions are introduced so as to break up or physically disrupt any pattern to the weave. These physical disruptions or variations during the formation of the weave provide the resultant composite material with a random, or non-uniform, highly unique cross section and a decorative appearance upon finishing.

After a sufficient desired quantity or thickness of the weave has been wound, the mandrel is removed from the lathe assembly and placed within a vacuum chamber. In one preferred embodiment, the vacuum chamber includes an elongated tube, typically formed from steel and having an inner chamber having a sliding tray that is movable along skids or rollers into and out of the vacuum chamber. An upper mold plate is positioned over the tray and is movable toward and away from the tray, into and out of pressurized engagement with the weave or sample, while the tray finctions as a lower or bottom mold plate. Thus, as the upper mold plate is moved downwardly, the weave is compressed between the two mold plates. An air bladder or other compression device is mounted within the vacuum chamber and is positioned above and mounted to the upper mold plate. The bladder generally is an inflatable air bladder made from a durable, high strength reinforced silicone rubber material, such as AMS 3320G, manufactured by GE. Upon inflation of the bladder, the upper mold plate is urged downwardly into engagement with the sample so as to apply substantially even pressure along the length of the sample within the tray.

The sample is initially vacuumed to remove any air, voids and resin mixture VOCS, are bubbles or pockets, and is monitored to detect a rise in temperature generally of up to 100.degree. F.-120.degree. F. or as needed depending on resin type, time to cure and various other factors, indicating the resin is starting to cure. Thereafter, the bladder is inflated to apply pressure of approximately 5 to 65 psi to the sample while the vacuum is continued. At the same fime, the sample is heated to approximately 200.degree.-220.degree. F. for approximately two hours and until the resin material has cured. The temperature and amount of pressure can further be varied depending on the type of resin used. The application of the vacuum and pressure from the bladder causes the fibers to shift and move, further enhancing the effects of the physical disruptions to the pattern of the sample to cause the sample to be formed with a non-uniform cross-section and topography.

After the carbon fiber weave or sample has been compressed and cured, leaving a substantially solid composite material, the sample is removed from the vacuum chamber, cooled and thereafter is cut off of the mandrel to form elongated planks or sheets of carbon fiber composite. The planks or sheets of carbon fiber composite then are put through a finishing process including planing the composite sheets, cutting the sheets into sections and then sanding and assembling the sections into a variety of products.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

Prior Art high performance CF/Epoxy composites are produced via a labor intensive winding and hand layup process which is both costly and severely limits the control over the final component micro-meso structure and hence the performance, reliability and repeatability of the parts and process. Chopped or short mixed carbon fiber/epoxy composites are a cheap alternative to continuous CF/Epoxy systems however the manufacturing processes utilized to form short Fiber composites (injection, spray molding and pressing) provides little control of the internal fiber phase alignment—limiting the mechanical performance and reliability of final parts.

The inventors have developed apparatus, systems, and methods for additive manufacturing of short carbon fibers in a thermoset polymer matrix which have a high degree of structural alignment over conventional cast or pressed short/chopped carbon fiber polymer composites. In various embodiments, the short carbon fibers can be produced in an acrylate, methacrylate, epoxy, cyanate ester or isocyanate matrix. In various embodiments the apparatus, systems, and methods provide additive manufacturing of a fibre-reinforced polymer (FRP) product using an additive manufacturing print head; a reservoir in the additive manufacturing print head; short carbon fibers in the reservoir, wherein the short carbon fibers are randomly aligned in the reservoir; an acrylate, methacrylate, epoxy, cyanate ester or isocyanate resin in the reservoir, wherein the short carbon fibers are dispersed in the acrylate, methacrylate, epoxy, cyanate ester or isocyanate resin; a tapered nozzle in the additive manufacturing print head operatively connected to the reservoir, the tapered nozzle producing an extruded material that forms the fibre-reinforced polymer product; baffles in the tapered nozzle that receive the acrylate, methacrylate, epoxy, cyanate ester or isocyanate resin with the short carbon fibers dispersed in the acrylate, methacrylate, epoxy, cyanate ester or isocyanate resin; and a system for driving the acrylate, methacrylate, epoxy, cyanate ester or isocyanate resin with the short carbon fibers dispersed in the acrylate, methacrylate, epoxy, cyanate ester or isocyanate resin from the reservoir through the tapered nozzle wherein the randomly aligned short carbon fibers in the acrylate, methacrylate, epoxy, cyanate ester or isocyanate resin are aligned by the baffles and wherein the extruded material has the short carbon fibers aligned in the acrylate, methacrylate, epoxy, cyanate ester or isocyanate resin that forms the fibre-reinforced polymer product. The inventors' apparatus, systems, and methods have use in producing products used in aerospace, automotive, construction, defense, electronic, medical, high pressure vessels, medical, and other industries.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

High performance carbon fiber/thermoset polymer (CF/thermoset) composites are a potentially transformative materials solution for a range of applications including aerospace and defense as they can have mechanical properties approaching that of steel at a fraction of the density. However the development and application of these materials is limited by the process by which they are manufactured.

High performance CF/thermoset composites (typically based on aromatic epoxy resins) are produced via a labor intensive winding and hand layup process which is both costly and severely limits the control over the final component micro-meso structure and hence the performance, reliability and repeatability of the parts and process. Chopped or short mixed carbon fiber/epoxy composites are a cheap alternative to continuous CF/Epoxy systems however the manufacturing processes utilized to form short fiber composites (injection, spray molding and pressing) provides little control of the internal fiber phase alignment—limiting the mechanical performance and reliability of final parts.

Additive manufacture and 3D printing technologies offer the potential to both fully automate the production of CF composites and allow new degrees of freedom and control over the fiber placement orientation and microstructure—leading to vast improvements in performance, reliability scalability and reductions in cost. There is currently no commercial means of additively manufacturing continuous or short fibre-reinforced polymer (FRP) through direct ink writing (DIW) or any other AM process. This is in part a result of the limitations of current processing technologies which do not allow accurate spatial orientation of the fiber phase within the resin matrix in a part. Furthermore, the poor processability (non-Newtonian semi-solids) of current short fiber/epoxy composite systems precludes their use in all but the most basic of molding and casting processes—limiting the shape, complexity and architectural control over the final part. In addition—chopped or discrete CF/epoxy & potential continuous fiber DIW fiber composite deposition using direct ink wiring or other novel means is limited by current epoxy resin systems which preclude the use of DIW or any other method of constructing a self-supporting shape of any complexity that can mechanically constrain the fibers on a reasonable manufacturing timeframe (minutes/seconds).

Referring now to the drawings and in particular to FIGS. 1-4, embodiments of the inventor's apparatus, systems, and methods are shown. The embodiments are designated generally by the reference numeral 100. The embodiments 100 provide apparatus, systems, and methods for 3D printing and otherwise additively manufacturing short carbon fibers in a thermoset polymer matrix which have a high degree of structural alignment over conventional cast or pressed short/chopped carbon fiber polymer composite parts. In 3D printing various processes are used to make a three-dimensional object. In 3D printing, additive processes are used, in which successive layers of material are laid down under computer control. These objects can be of almost any shape or geometry, and are produced from a model or other electronic data source. The terms "short carbon fiber," "chopped carbon fiber," and "short/chopped carbon fiber" as used in this application have the meanings defined below.

Short Carbon Fiber: A fiber of nearly pure carbon in the range of 1 micron to 100 millimeters in length.

Chopped Carbon Fiber: A short carbon fiber that has been prepared by chopping.

Short/Chopped Carbon Fiber: A short carbon fiber that has chopped.

Figure 1:
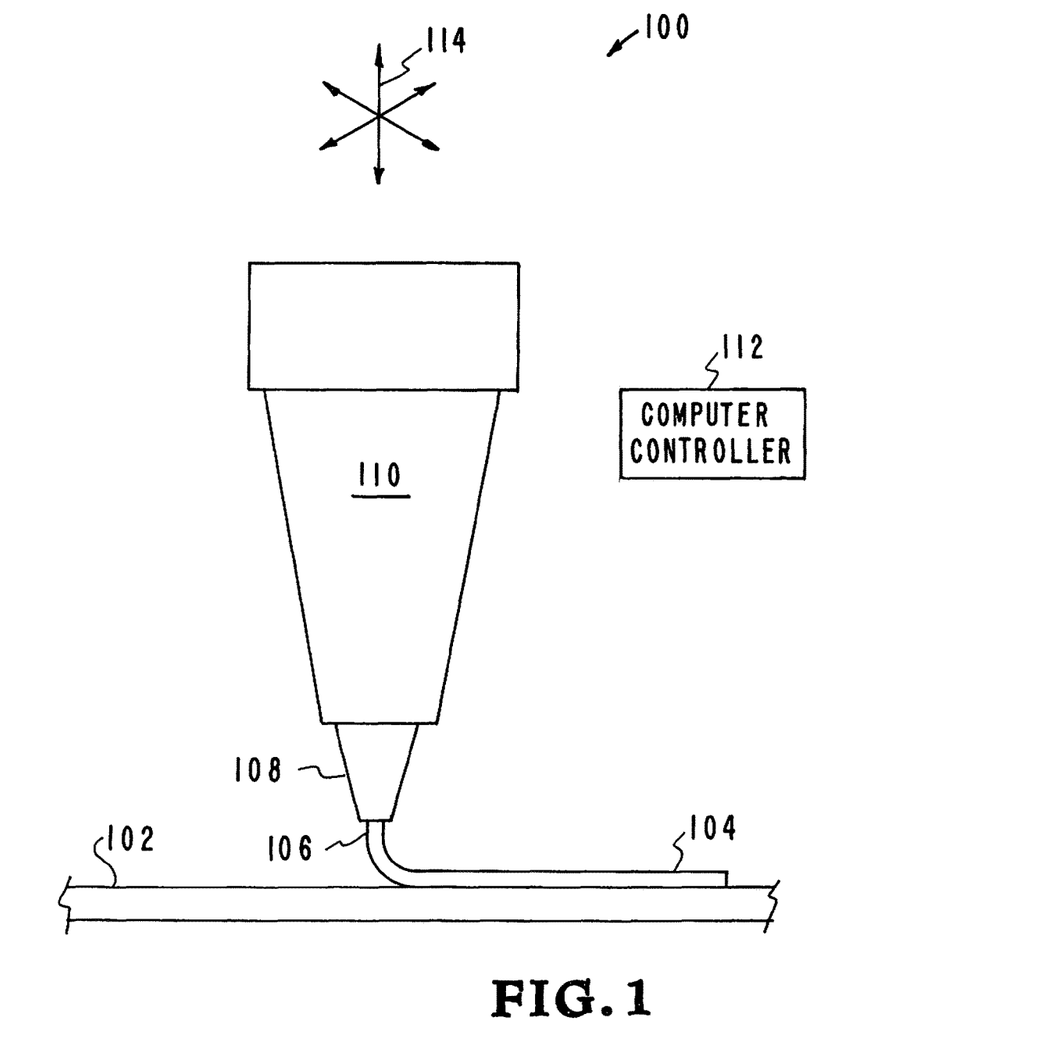
FIG. 1 illustrates one embodiment of the inventor's apparatus, systems, and methods.

An embodiment 100 of the inventor's apparatus, systems, and methods deposits short carbon fibers in a thermoset polymer matrix on a substrate is illustrated in FIG. 1. This embodiment 100 provides a DIW printing system with a delivery system, print head, and resin system that will allow the printing of complex 3D structures with controlled fiber alignments at ultimate volume fractions in the region of 60 vol % carbon fiber. The system 100 utilizes a combination of shear alignment, progressive fiber concentration and real-time deposition and curing of the composite using a 3-6 axis DIW stage system. The system 100 is based on the shear dispersal, alignment and concentration of fiber fraction within a resin system to yield a direct Ink Writable (DIW) system that can be utilized to 3D print complex architectures of highly aligned CF/epoxy resin composite with feature resolutions as low as 150 um. The system 100 includes:

1) Shear dispersal of short carbon fiber in an acrylate, methacrylate, epoxy, cyanate ester or isocyanate resin matrix
2) Pressure and shape driven shear alignment of the fibers in a print head
3) Pressure and size exclusion driven concentration of the fiber loading fraction in the print head
4) Thermal and UV curing of Extruded material in real time
5) Controlled DIW printing of free standing or rapidly curable CF/epoxy material.

As illustrated in FIG. 1, extruded material 104 composed of short carbon fibers in a thermoset polymer matrix are deposited on a substrate 102 by print head 110. The print head 110 has a nozzle 108 for extruding 106 the material 104 onto the substrate 102. Movement of the print head 110 is controlled by computer controller 112 which provides freedom of movement along all axes as indicated by the arrows 114. The product to be created by the system 100 is fed to the computer controller 112 with the widely used numerical control programming language G-Code. The computer controller 112 uses the instructions to move the print head 110 through a series of movements along the substrate 102 forming the product to be created by the system 100.

Figure 2A:
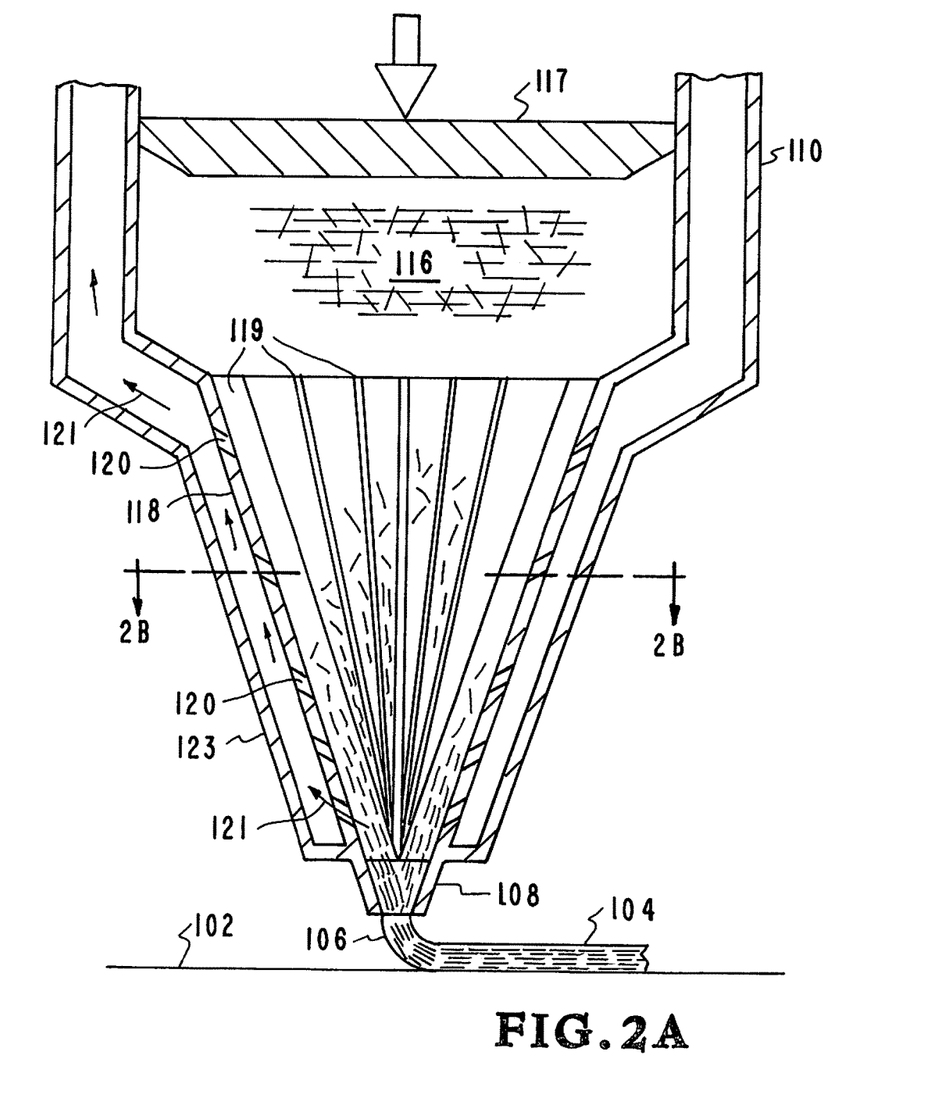
FIG. 2A is a cut away view of the print head shown in FIG. 1.
Figure 2B:
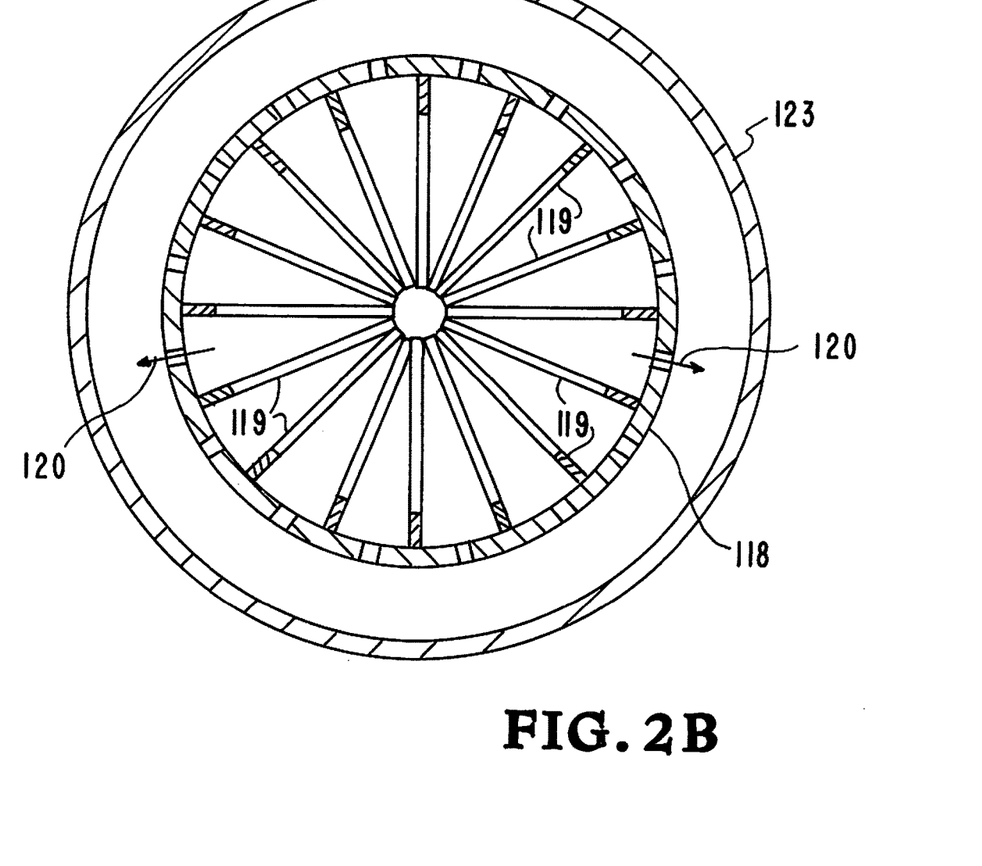
FIG. 2B is a cross section view of the print head.

Referring now to FIGS. 2A and 2B additional details of the inventor's apparatus, systems, and methods 100 shown in FIG. 1 are provided. FIG. 2A is a cut away view of the print head 110 showing the short carbon fibers in a thermoset polymer matrix 116, the print head nozzle 108 that is shown extruding 106 the material 104 onto the substrate 102. FIG. 2B is a cross section view of the print head 110.

FIG. 2A shows an upper reservoir in the print head 110 that holds prepared (randomly aligned) short fibers dispersed in the resin. The randomly aligned short fibers dispersed in resin are designated by the reference numeral 116. The randomly aligned short fibers dispersed in resin 116 can be prepared in a number of ways. For example, they can be prepared using a commercial off-axis centrifugal mixer a fiber loading in the region of 1-15 Wt % is shear dispersed in an uncured acrylate, methacrylate, epoxy, cyanate ester or isocyanate matrix. Mixing speeds of 2500-3500 rpm and mixing times of 0.5 to 20 minutes may be used to achieve initial dispersion tailor the final fiber size within the matrix. Inorganic filler such as fumed silica may be added at this stage to rheologically match the flow properties of the resin with the fiber phase and promote fiber-resin phase adhesion at high shear during printing. The final flow rheology is tailorable, however the compounded materials should be a thixotropic non-Newtonian fluid.

Figure 5:
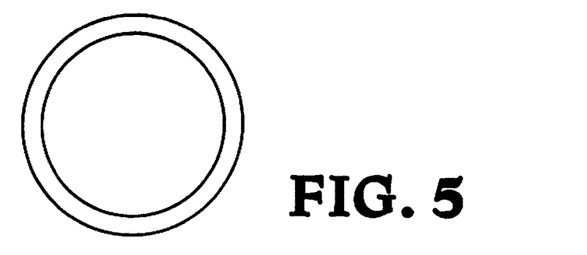
FIG. 5 shows a circular nozzle.
Figure 6:
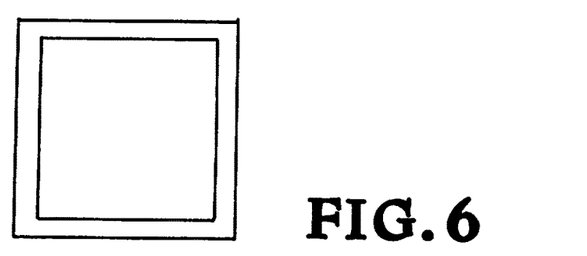
FIG. 6 shows a square nozzle.
Figure 7:
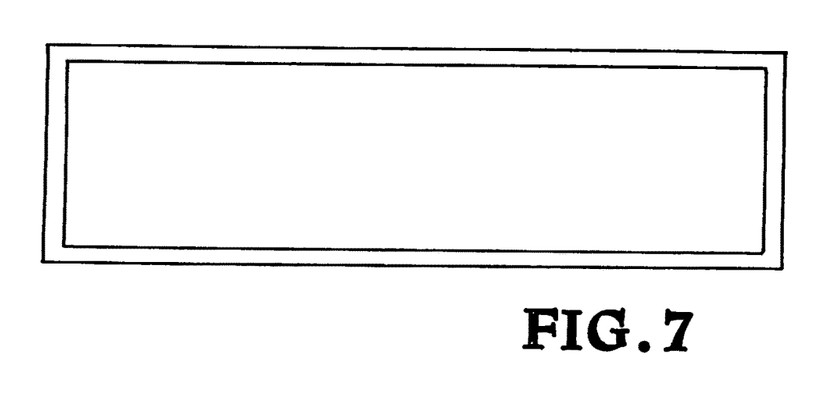
FIG. 7 shows a rectangular nozzle.

A movable ram 117 is pressure actuated to drive the ink 116 into the nozzle 108 during printing. The print head 116 has a primary tapered nozzle section 118 which has a "taper in" over the range of 1-45 degrees symmetrical and a variable length. Internal baffles 119 in primary tapered nozzle section 118 provide wall alignment of the short fibers 116. Angled resin sweat holes 120 of a size 5-100 um angled against the direction of the taper and in increasing numbers as the nozzle 108 reaches the tip 122 allowing progressive separation of the resin carrier 121 from the fiber 116. The nozzle tip 122 can be of variable sizes and shapes as illustrated in FIGS. 5, 6, and 7. A Secondary outer sheathe 123 allows collection of separated resin 121. The construction of the nozzle 108 can be of stainless steel or some suitable alloy, coated internally with a low surface energy, non-reactive polymer layer such as PTFE.

Figure 3A:
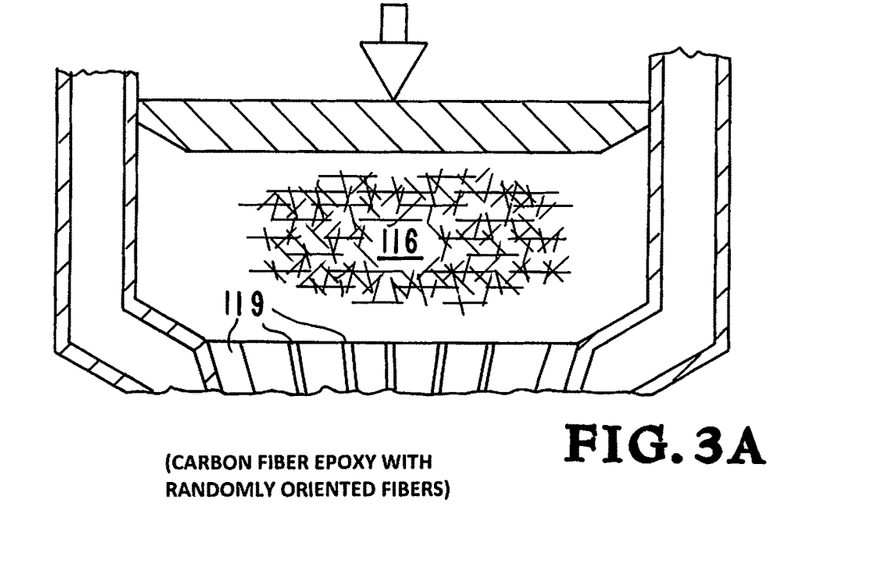
FIG. 3A shows a portion of the upper reservoir that holds randomly aligned short fibers dispersed in resin.
Figure 3B:
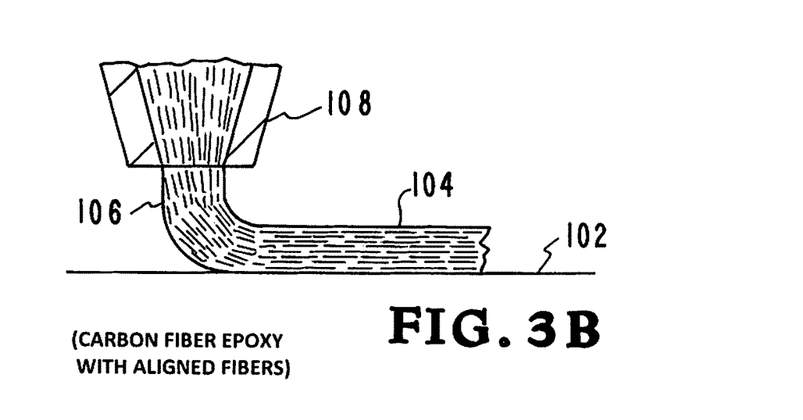
FIG. 3B shows the fibers aligned in the resin as they are extruded from the nozzle.

Referring now to FIGS. 3A and 3B, views of the short carbon fibers in a thermoset polymer matrix 116 are shown beginning with the fibers shown randomly aligned in the resin in FIG. 3A and ending with the fibers aligned in the resin in FIG. 3B.

FIG. 3A shows a portion of the upper reservoir that holds the randomly aligned short fibers dispersed in resin as designated by the reference numeral 116. Movement of the fibers and resin through the baffles 119 aligns the fibers until they are fully aligned. FIG. 3B shows the fibers aligned in the resin as they are extruded from the nozzle 108 and deposited on the substrate 102.

Figure 4:
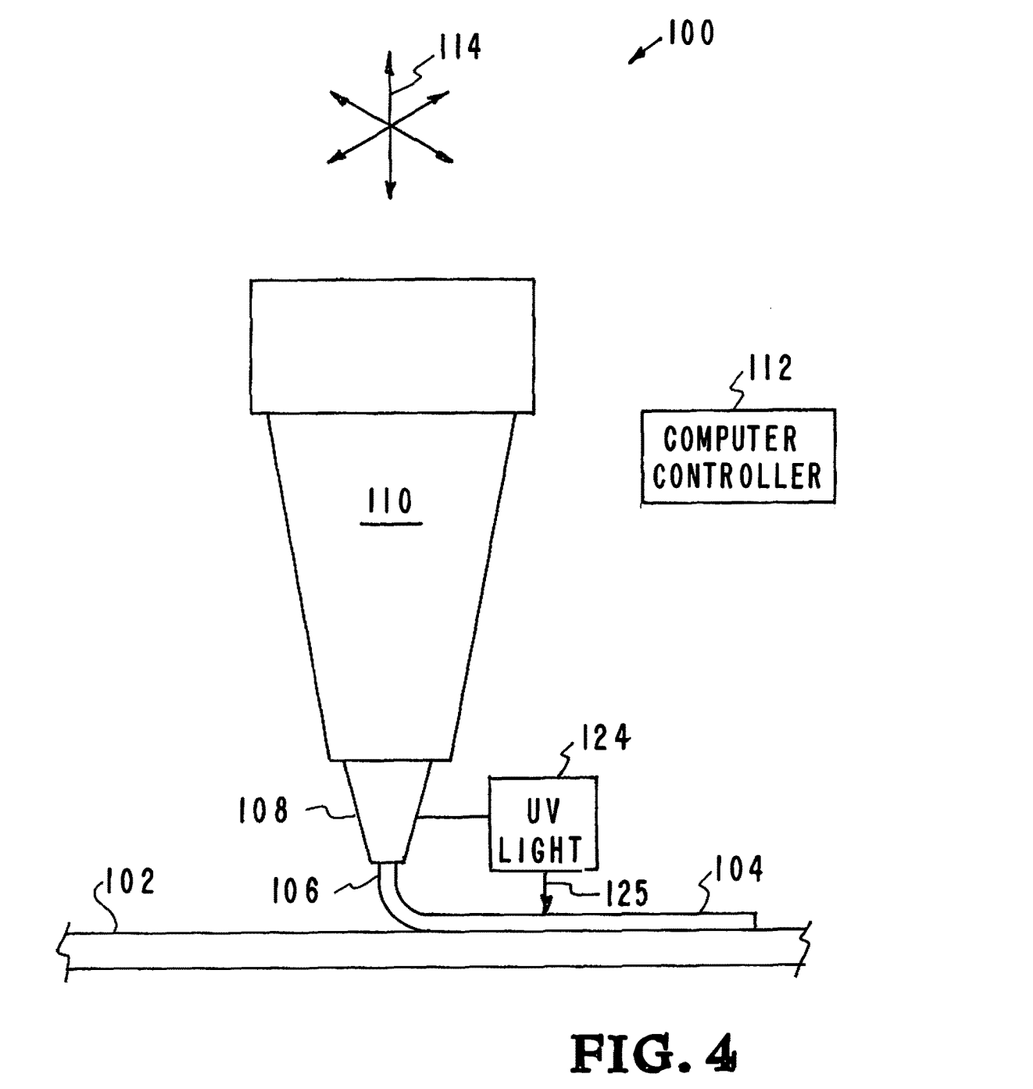
FIG. 4 shows a satellite curing head attached to the print head.

Referring now to the FIG. 4, a satellite curing head 124 is attached to the print head 110 and trails the extrudate 104. Heat or UV light 125 is focused from the curing head 124 onto the printed extrudate 104 to induce real time curing.

The nozzle tip 122 can be of variable sizes and shapes. Referring to FIGS. 5, 6, and 7 some examples of nozzle tip shapes are shown. FIG. 5 shows a circular nozzle. FIG. 6 shows a square nozzle. FIG. 7 shows a rectangular nozzle. The size and shape of the nozzle allows for the best extrusion of the short fibers in resin to produce the final product.

Figure 8:
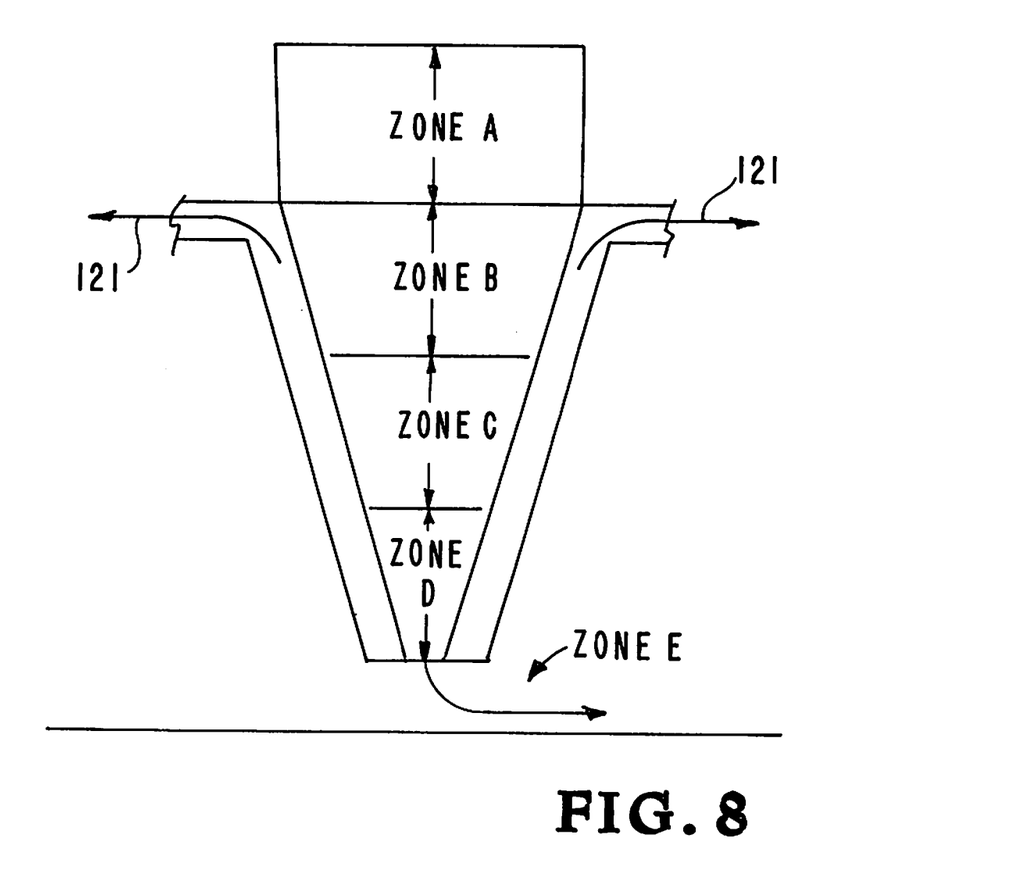
FIG. 8 is a view of the system showing zones A thorough E.
Figure 9:
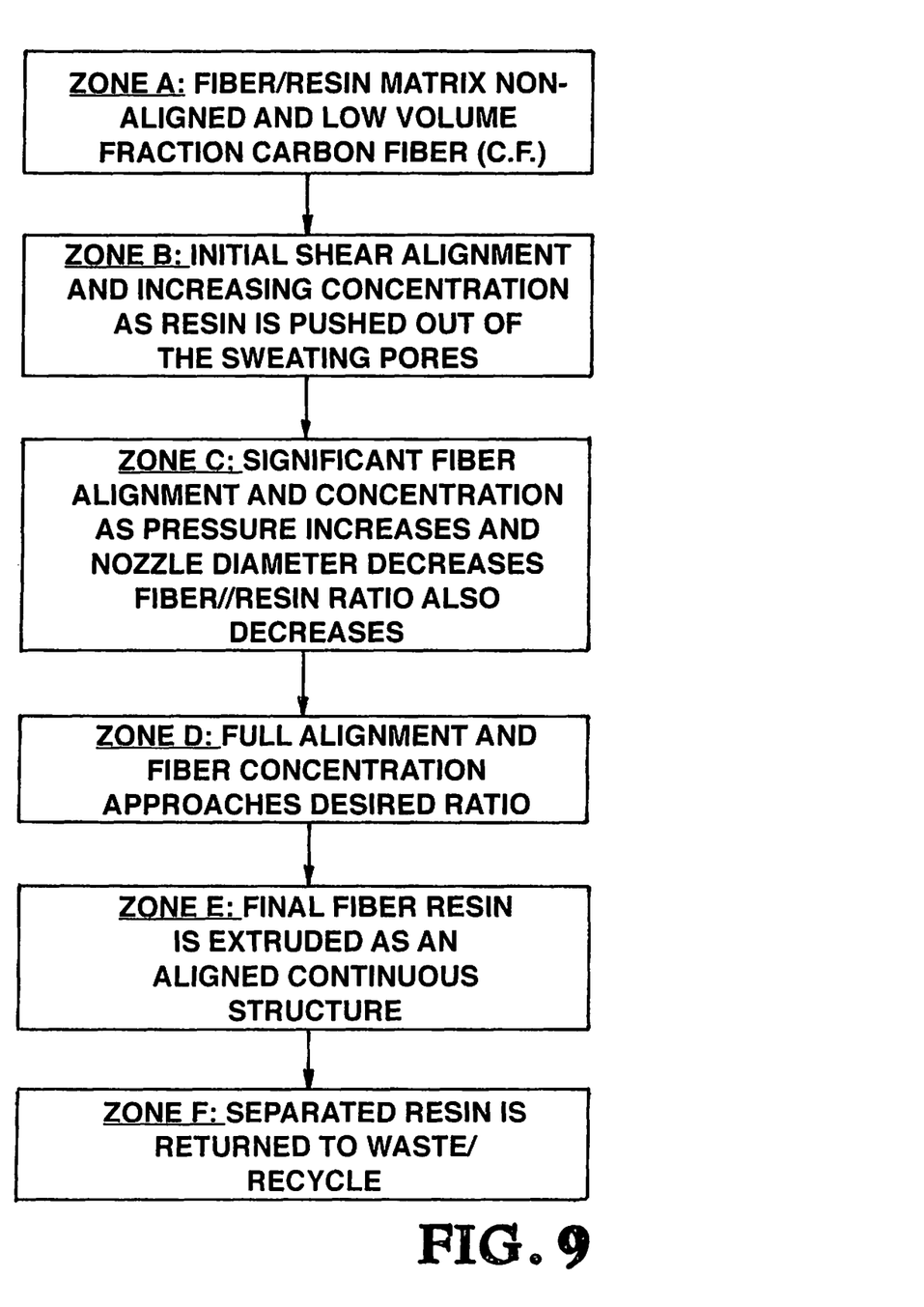
FIG. 9 is a flow chart illustrating the system.

Referring now to FIGS. 8 and 9, additional information about the inventor's apparatus, systems, and methods for producing a fibre-reinforced polymer product by depositing short carbon fibers in a thermoset polymer matrix on a substrate is provided. FIG. 8 is a view of the inventor's apparatus, systems, and methods for producing a fibre-reinforced polymer product with zones A thorough E in the system identified. FIG. 9 is a flow chart illustrating operation of the inventor's apparatus, systems, and methods for producing a fibre-reinforced polymer product.

A print head, feed system and a curing heat/UV source are all mounted on a 3-6 axis DIW computer controlled precision stage. Referring to both FIGS. 8 and 9, the operation of the inventor's apparatus, systems, and methods for producing a fibre-reinforced polymer product by depositing short carbon fibers in a thermoset polymer matrix on a substrate are illustrated in Zones A-E. In Zone A, a relatively low CF concentration the taper of the nozzle and internal baffle guides begin to shear align the fibers along their narrow axis and in the direction of the flow. During this pressurized alignment process some resin is extruded though the wall sweat pores resulting in some increase in the fiber loading fraction. The size, angle and position of the sweat holes disallows any fiber passage to the outer sheathe and minimizes the chance of blocking. In Zone C, the fiber fraction continues to concentrate and alignment in the flow direction is increased. In Zone D, Final fiber volume fraction and alignment are reached prior to controlled extrusion as an aligned continuous structure in Zone E. in Zone F, separated carrier resin free of CF, is collected for recycling/disposal. A satellite curing head is attached to the print Nozzle carriage and trails the extrudate. The inventor' system has the ability to both align and concentrate CF within a polymer matrix during the printing process. The combination of this printing system with the latent curing acrylate, methacrylate, epoxy, cyanate ester or isocyanate system and DIW technology yields a complete system capable of 3D printing complex geometries at high resolutions and high fiber volume fractions with high degrees of control of internal fiber alignment.

Figure 10:
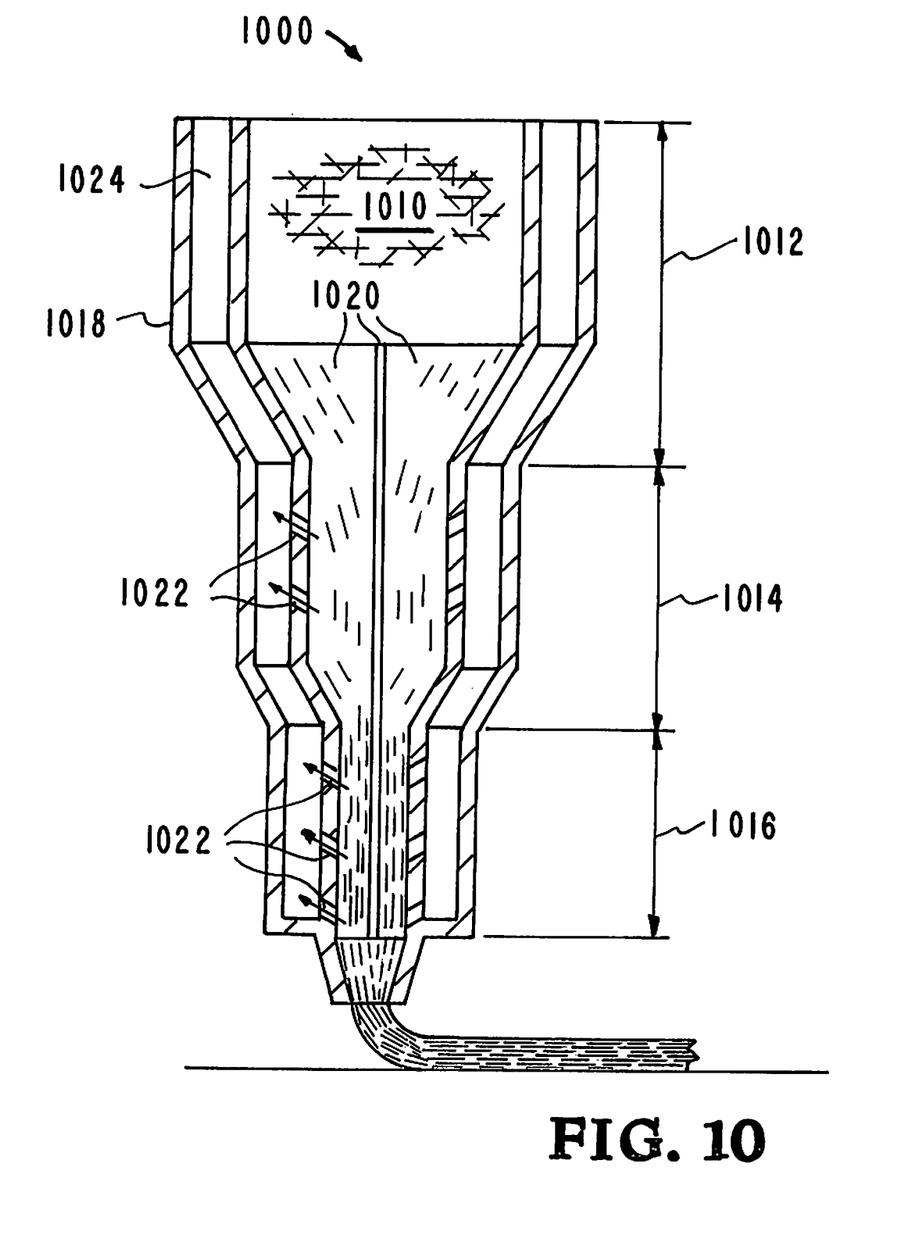
FIG. 10 illustrates another embodiment of the print head shown in FIG. 1.

Referring now to FIG. 10, another embodiment of the print head shown in FIG. 1 is illustrated. This embodiment is designated generally by the reference numeral 1000. FIG. 10 shows an upper reservoir in the print head that holds prepared (randomly aligned) short fibers dispersed in the resin. The randomly aligned short fibers dispersed in resin are designated by the reference numeral 1010. The randomly aligned short fibers 1010 dispersed in resin can be prepared in a number of ways. For example, they can be prepared using a commercial off-axis centrifugal mixer a fiber loading in the region of 1-15 Wt % is shear dispersed in an acrylate, methacrylate, epoxy, cyanate ester or isocyanate matrix. Mixing speeds of 2500-3500 rpm and mixing times of 0.5 to 20 minutes may be used to achieve initial dispersion tailor the final fiber size within the matrix. Inorganic filler such as fumed silica may be added at this stage to rheologically match the flow properties of the resin with the fiber phase and promote fiber-resin phase adhesion at high shear during printing. The final flow rheology is tailorable, however the compounded materials should be a thixotropic non-Newtonian fluid.

The print head 1000 has a first tapered nozzle section 1012 which has a taper portion "taper in" over the range of 1-45 degrees symmetrical and a variable length and a straight section that does not have a taper. The combination of a taper section and a straight section improves alignment of the short fibers 1010 as they are moved through the print head 1000. Internal baffles 1020 in the first section 1012 provide wall alignment of the short fibers 1010. Angled resin sweat holes 1022 of a size 5-100 um angled against the direction of the taper and in increasing numbers as the nozzle extends to the lower end of the taper allows progressive separation of the resin carrier 1024 from the fiber 1010.

The print head 1000 has a second tapered nozzle section 1014 which has a taper portion "taper in" over the range of 1-45 degrees symmetrical and a variable length and a straight section that does not have a taper. The combination of a taper section and a straight section improves alignment of the short fibers 1010 as they are moved through the print head 1000. Internal baffles 1020 in the second section 1012 provide wall alignment of the short fibers 1010. Angled resin sweat holes 1022 of a size 5-100 um angled against the direction of the taper and in increasing numbers as the nozzle extends to the lower end of the taper allows progressive separation of the resin carrier 1024 from the fiber 1010.

The print head 1000 has a third tapered nozzle section 1016 which has a taper portion "taper in" over the range of 1-45 degrees symmetrical and a variable length and a straight section that does not have a taper. The combination of a taper section and a straight section improves alignment of the short fibers 1010 as they are moved through the print head 1000. Internal baffles 1020 in the third section 1012 provide wall alignment of the short fibers 1010. Angled resin sweat holes 1022 of a size 5-100 um angled against the direction of the taper and in increasing numbers as the nozzle extends to the lower end of the taper allows progressive separation of the resin carrier 1024 from the fiber 1010.

The nozzle tip can be of variable sizes and shapes. A secondary outer sheathe 1020 allows collection of separated resin 1024. The construction of the nozzle can be of stainless steel or some suitable alloy, coated internally with a low surface energy, non-reactive polymer layer such as PTFE.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for additive manufacturing a fibre-reinforced polymer product, comprising:
an additive manufacturing print head;
a reservoir in said additive manufacturing print head;
short carbon fibers in said reservoir, wherein said short carbon fibers are randomly aligned in said reservoir;
an acrylate, methacrylate, epoxy, cyanate ester or isocyanate resin in said reservoir, wherein said short carbon fibers are dispersed in said acrylate, methacrylate, epoxy, cyanate ester or isocyanate resin;
a tapered nozzle in said additive manufacturing print head operatively connected to said reservoir, said tapered nozzle producing an extruded material that forms the fibre-reinforced polymer product;
baffles in said tapered nozzle that receive said acrylate, methacrylate, epoxy, cyanate ester or isocyanate resin with said short carbon fibers dispersed in said acrylate, methacrylate, epoxy, cyanate ester or isocyanate resin;
a system for driving said acrylate, methacrylate, epoxy, cyanate ester or isocyanate resin with said short carbon fibers dispersed in said acrylate, methacrylate, epoxy, cyanate ester or isocyanate resin from said reservoir through said tapered nozzle wherein said randomly aligned short carbon fibers in said acrylate, methacrylate, epoxy, cyanate ester or isocyanate resin are aligned by said baffles and wherein said extruded material has said short carbon fibers aligned in said acrylate, methacrylate, epoxy, cyanate ester or isocyanate resin that forms said fibre-reinforced polymer product;
holes in said tapered nozzle for allowing flow of said acrylate, methacrylate, epoxy, cyanate ester or isocyanate resin out of said tapered nozzle; and
a sheath around said tapered nozzle for the collection said acrylate, methacrylate, epoxy, cyanate ester or isocyanate resin that flows out of said holes in said tapered nozzle.

2. The apparatus for additive manufacturing a fibre-reinforced polymer product of claim 1 further comprising a curing system operatively connected to said additive manufacturing print head that directs curing energy onto said extruded material.

3. The apparatus for additive manufacturing a fibre-reinforced polymer product of claim 2 wherein said curing system operatively connected to said additive manufacturing print head that directs curing energy onto said extruded material is an ultra violet light curing system that directs ultra violet light energy onto said extruded material.

4. The apparatus for additive manufacturing a fibre-reinforced polymer product of claim 2 wherein said curing system operatively connected to said additive manufacturing print head that directs curing energy onto said extruded material is a heat curing system that directs heat energy onto said extruded material.

5. The apparatus for additive manufacturing a fibre-reinforced polymer product of claim 1 wherein said tapered nozzle has a taper in over the range of 1-45 degrees symmetrical.

6. The apparatus for additive manufacturing a fibre-reinforced polymer product of claim 1 wherein said tapered nozzle has a first taper section and a second non-tapered section.

7. The apparatus for additive manufacturing a fibre-reinforced polymer product of claim 1 wherein said system for driving said acrylate, methacrylate, epoxy, cyanate ester or isocyanate resin and said short carbon fibers through said tapered nozzle in a manner to rheologically match said resin and said short carbon fibers.

8. The apparatus for additive manufacturing a fibre-reinforced polymer product of claim 7 further comprising an inorganic filler with said acrylate, methacrylate, epoxy, cyanate ester or isocyanate resin and said short carbon fibers.

9. The apparatus for additive manufacturing a fibre-reinforced polymer product of claim 8 wherein said inorganic filler is silica.

10. The apparatus for additive manufacturing a fibre-reinforced polymer product of claim 1 wherein said acrylate, methacrylate, epoxy, cyanate ester or isocyanate resin is an epoxy resin.

* * * * *